United States Patent [19]

Ikeda et al.

[11] Patent Number: 5,590,540
[45] Date of Patent: Jan. 7, 1997

[54] AIR CONDITIONER FOR VEHICLES

[75] Inventors: Susumu Ikeda; Toshimi Isobe; Atsuo Inoue, all of Isesaki; Toshihiko Fujita, Sawa; Akihiro Tajiri, Wako; Mitsuru Ishikawa, Wako; Choji Sakuma, Wako; Nobuyuki Yuri, Wako, all of Japan

[73] Assignees: Honda Giken Kogyo Kabushiki Kaisha, Tokyo; Sanden Corporation, Gunma, both of Japan

[21] Appl. No.: 484,405

[22] Filed: Jun. 7, 1995

[30] Foreign Application Priority Data

Jul. 6, 1994 [JP] Japan ................................. 6-155027

[51] Int. Cl.$^6$ .................................................. B60H 1/00
[52] U.S. Cl. ........................ 62/180; 62/161; 236/49.3; 454/75; 454/258
[58] Field of Search .......................... 62/179, 180, 244, 62/161, 162, 163, 164, 160, 180, 186; 165/16; 454/75, 256, 258, 229; 236/49.3, 91 R, 91 C, 91 D, 91 E, 91 F

[56] References Cited

U.S. PATENT DOCUMENTS

| | | | |
|---|---|---|---|
| 4,320,628 | 3/1982 | Okajima | 165/16 X |
| 4,347,712 | 9/1982 | Benton et al. | 236/49.3 X |
| 4,362,026 | 12/1982 | Miller | 62/180 X |
| 4,391,320 | 7/1983 | Inoue et al. | 62/180 X |

Primary Examiner—Harry B. Tanner
Attorney, Agent, or Firm—Lyon & Lyon

[57] ABSTRACT

An air conditioner for vehicles includes a damper for switching among an outside-air inlet mode, an inside-air inlet mode and an outside/inside-air inlet mode, a manual switch for selecting any one of the respective inlet modes, an automatic switch for automatically selecting one of the respective inlet modes, a heating and cooling operation unit, an inside-air temperature sensor, an outside-air temperature sensor and a control unit for selectively controlling the respective inlet modes based on the condition of the heating and cooling operation unit, the condition of the respective switches and the difference between the temperatures detected by the respective temperature sensors. In the air conditioner, an optimum air conditioning in correspondence to the load required for air conditioning can be realized from the viewpoint of saving of energy and efficient operation.

7 Claims, 6 Drawing Sheets

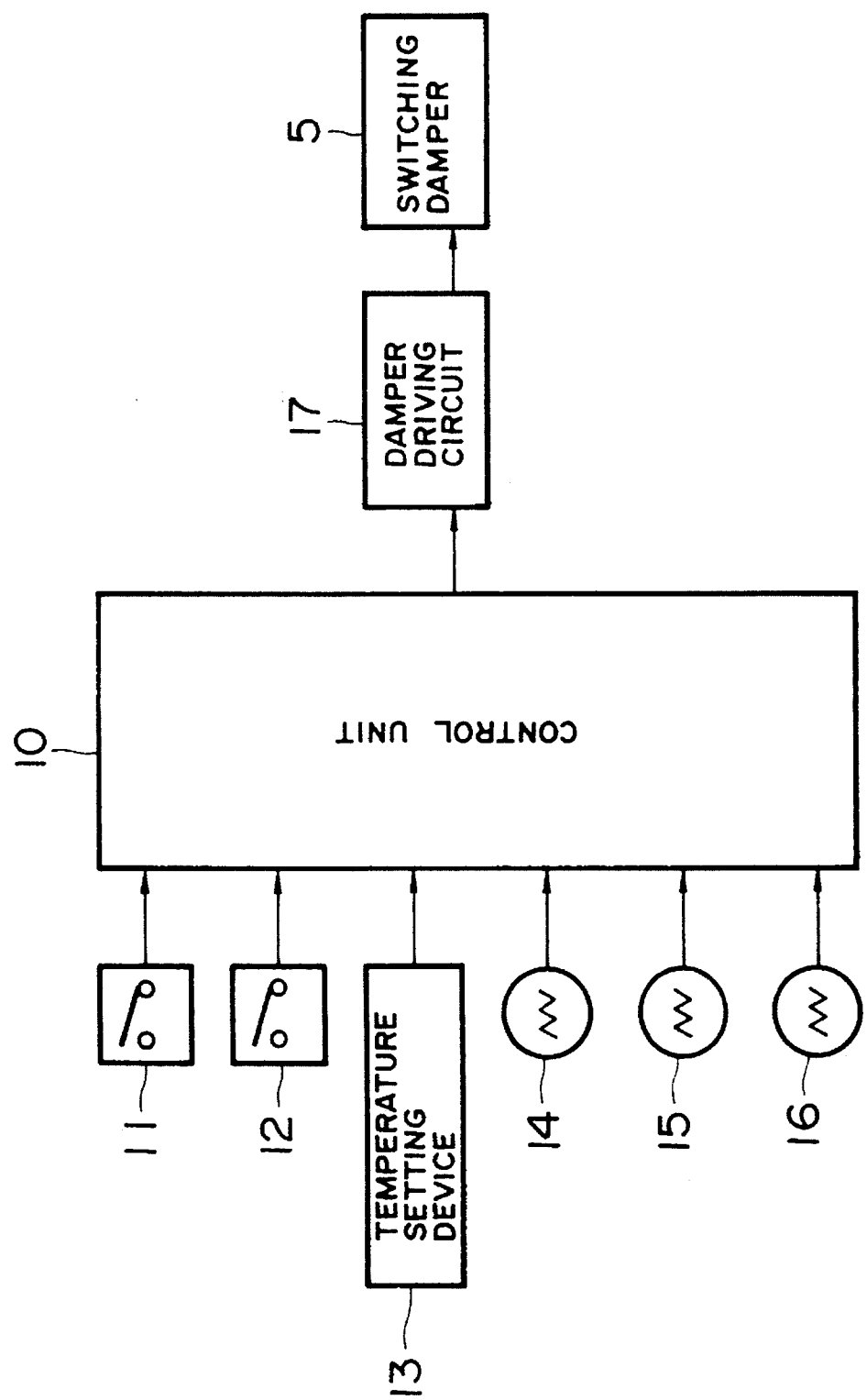

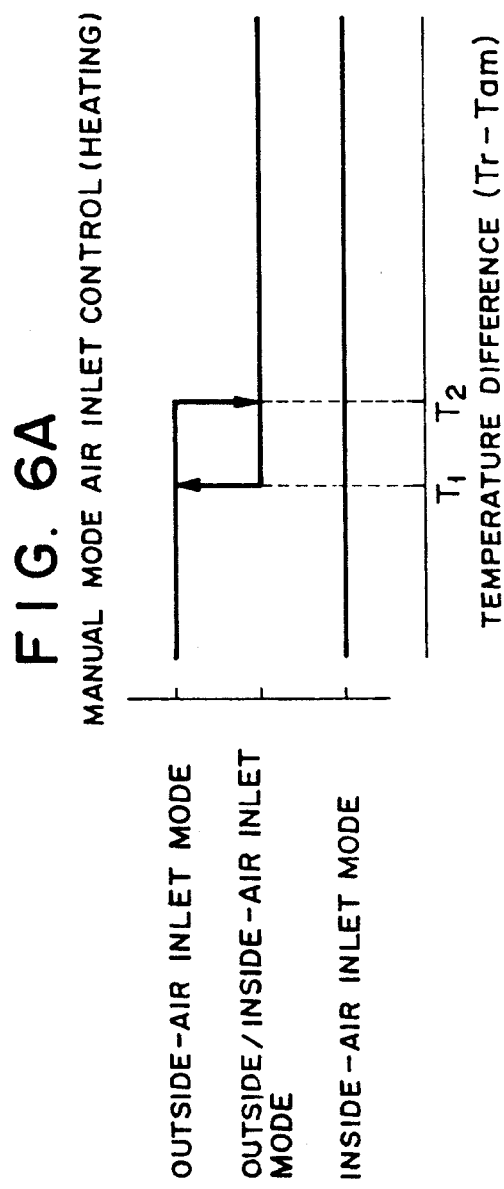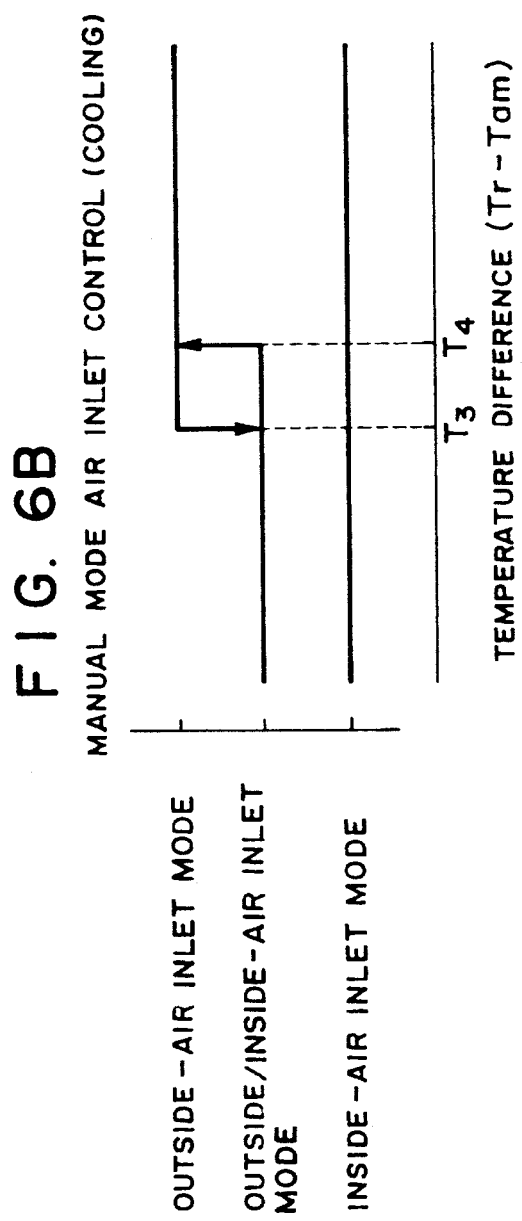

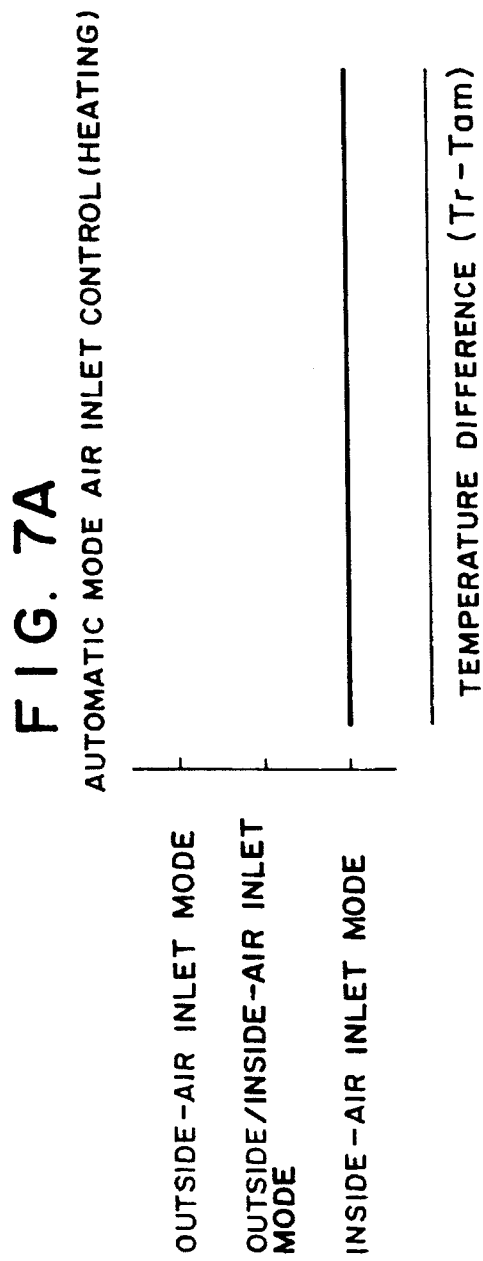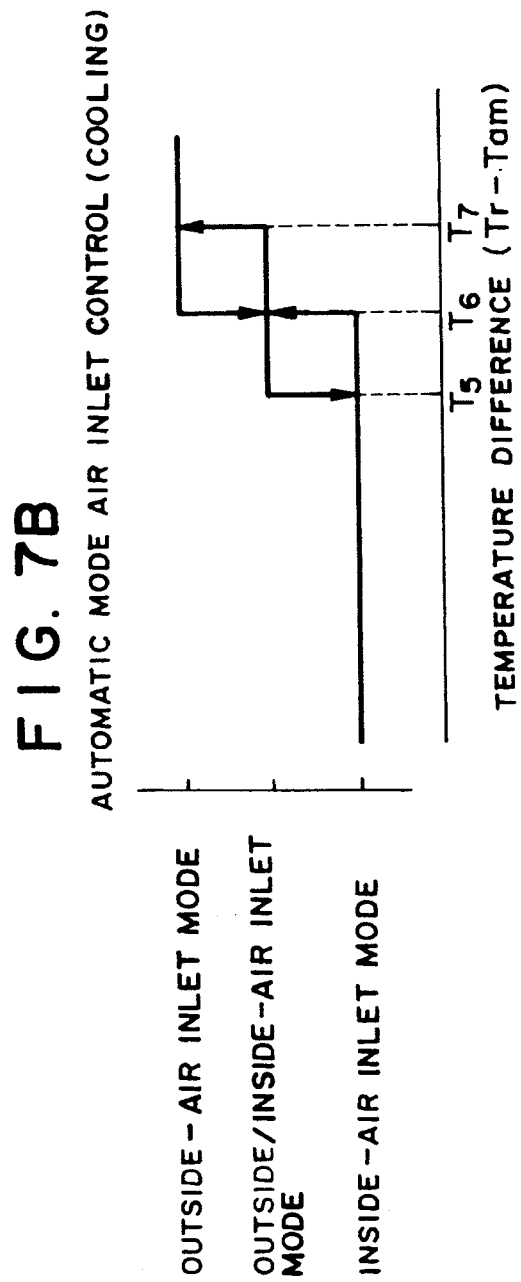

400
AIR CONDITIONER FOR VEHICLES

BACKGROUND OF THE INVENTION

1. Field of the Invention

The present invention relates to an air conditioner for a vehicle which heats or cools the interior of the vehicle by heating or cooling outside air or inside air, and specifically to an air conditioner suitable for use as a heat-pump type air conditioner mounted in an electric automobile.

2. Description of the Related Art

In a conventional air conditioner of this type, the air conditioner generally has a motor fan for drawing outside air from an outside-air inlet port and inside air from an inside-air inlet port and a heat pump unit for exchanging heat with air before discharging the air into the interior of the vehicle. When the interior of the vehicle is to be heated, the air is heated by the heat pump unit, when the interior of the vehicle is to be cooled, the air is cooled by the heat pump unit, and then the heat-exchanged air is supplied into the interior of the vehicle for air conditioning.

When the heating and cooling operation is automatically controlled, the control is performed based on a temperature calculated by the following equation (TAO: target temperature of discharged air).

$$TAO = K_s \cdot T_s - K_r \cdot T_r - K_{am} \cdot T_{am} - K_{rad} \cdot T_{rad} + C$$

In the above equation, "Ts" represents a temperature set by a user, "Tr" represents a temperature of the inside air, "Tam" represents a temperature of the outside air, "Trad" represents a value converted into a temperature value from an amount of solar radiation, "Ks" represents a set temperature factor, "Kr" represents an inside-air temperature factor, "Kam" represents an outside-air temperature factor, "Krad" represents a solar radiation factor and "C" represents a correction factor. These factors are selected as appropriate substantive values depending upon size of the interior space, etc.

Thus, the heating and cooling operation is selectively controlled based on the target temperature of discharged air, and the control of inlet air is performed at one of the outside-air mode and the inside-air mode.

In such a conventional air conditioner for vehicles, however, in a case where the outside-air mode is selected in the heating operation mode, even when the temperature of the outside air is very low and the load for the heating operation is great, the operation is continued utilizing only this low-temperature outside air. On the other hand, in a case where the outside-air mode is selected in the cooling operation mode, even when the temperature of the outside air is very high and the load for the cooling operation is great, the operation is continued utilizing only this high-temperature outside air. Therefore, the efficiency for heating and cooling operation relative to the load required for air conditioning of the interior of the vehicle is not good, such a condition is disadvantageous for saving energy, and particularly in an electric automobile, this causes a great reduction of the travel distance thereof.

SUMMARY OF THE INVENTION

It is an object of the present invention to provide an air conditioner for vehicles which can select a combined outside/inside-air inlet means as well as separate outside-air inlet means and inside-air inlet means, and which can save energy by operating these inlet means depending upon the load for air conditioning.

To accomplish the above object, an air conditioner for vehicles according to the present invention comprises an outside-air inlet means for drawing in outside air, an inside-air inlet means for drawing in inside air and an outside/inside-air inlet means for drawing in both outside air and inside air; a manual switch means for freely selecting any one of the respective inlet means and an automatic switch means for automatically selecting one of the respective inlet means; heating-operation means for heating the air from any one of the respective inlet means and supplied by a fan; cooling-operation means for cooling the air supplied by the fan; an inside-air temperature sensor for detecting a temperature of inside air; an outside-air temperature sensor for detecting a temperature of outside air; and control means for selectively operating the respective inlet means based on a condition of the respective heating and cooling-operation means, a condition of the respective switch means and a difference between the temperatures detected by the respective temperature sensors.

In such an air conditioner, since the outside-air inlet means, the inside-air inlet means and the outside/inside-air inlet means are selectively driven depending upon the difference between the temperatures of the outside air and the inside air, an optimum air conditioning in correspondence to the load required for air conditioning can be realized from the viewpoint of saving of energy and efficient operation.

In the air conditioner, for example, when the manual switch means selects the outside-air inlet means, the control means selectively drives the outside-air inlet means or the outside/inside-air inlet means based on the temperatures detected by the respective temperature sensors. Namely, in a heating operation mode, when the temperature of the outside air is low and the load required for the heating is great, the air inlet mode is switched to the outside/inside-air inlet means, and the outside air and the inside air are both heated and the heating operation is continued. In a cooling operation, when the temperature of the outside air is high and the load required for the cooling is great, similarly the air inlet mode is switched to the outside/inside-air inlet means, and the outside air and the inside air are both cooled and the cooling operation is continued.

When the automatic switch means is selected and the cooling-operation means is driven, the control means selectively drives the outside-air inlet means, the inside-air inlet means or the outside/inside-air inlet means based on the temperatures detected by the respective temperature sensors. Namely, in such a cooling operation mode, when the temperature of the outside air is high and the load required for the cooling is great, the inside-air inlet means is selected. When the temperature of the outside air is low and the load required for the cooling is small, the outside-air inlet means is selected. When the combination of outside air temperature and the load required for the cooling is between the driving condition of the inside-air inlet means and the driving condition of the outside-air inlet means, the outside/inside-air inlet means is selected.

By such a control depending upon the load for air conditioning, an efficient and optimum control from the viewpoint of saving of energy can be achieved.

Further objects, features, and advantages of the present invention will be understood from the detailed description of the preferred embodiment of the present invention with reference to the appropriate figures.

BRIEF DESCRIPTION OF THE DRAWINGS

A preferred exemplary embodiment of the invention will now be described with reference to the appropriate figures, which is given by way of example only, and is not intended to limit the present invention.

FIG. 3 is a block diagram of a control unit for controlling air inlet modes in the air conditioner shown in FIG. 1.

FIGS. 6A and 6B are graphs showing switching of air inlet modes in the manual mode in the air conditioner shown in FIG. 1.

FIGS. 7A and 7B are graphs showing switching of air inlet modes in the automatic mode in the air conditioner shown in FIG. 1.

DETAILED DESCRIPTION OF THE PREFERRED EMBODIMENTS

Figure 1:
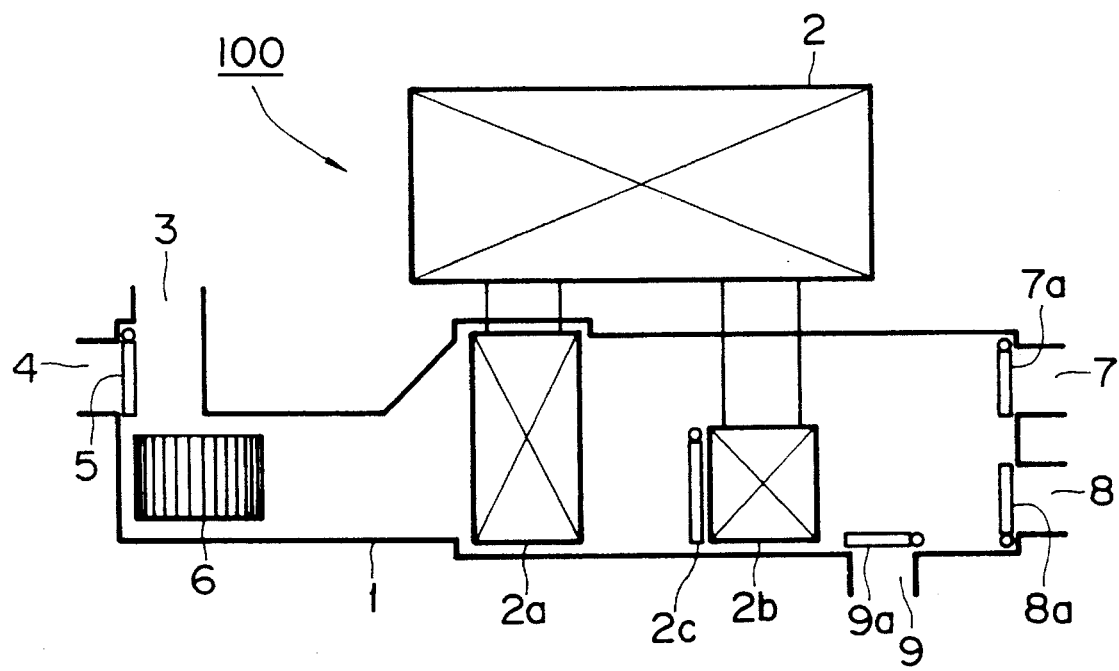
FIG. 1 is a schematic view of an air conditioner for vehicles according to an embodiment of the present invention.

Referring to FIGS. 1 to 7, an air conditioner 100 for vehicles according to an embodiment of the present invention has a duct 1 through which the air for air conditioning is sent to the interior of the vehicle, and a heat pump unit 2. In this duct 1, outside-air inlet port 3 and inside-air inlet port 4 are provided on the upstream portions in the flow direction of the air. The opening and closing of respective inlet ports 3 and 4 are controlled by a motor-driving switching damper 5.

Figure 2A:
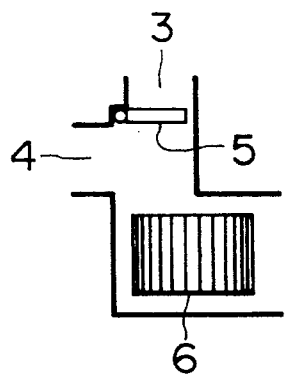
FIGS. 2A and 2B are schematic views of a part of the air conditioner shown in FIG. 1, showing switching conditions of a damper in air inlet modes different from that shown in FIG. 1.
Figure 2B:
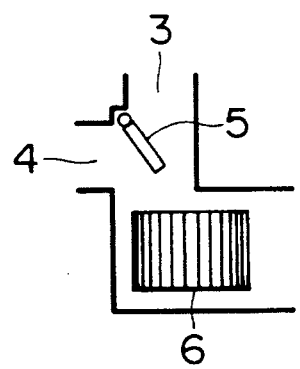

When damper 5 opens outside-air inlet port 3 and closes inside-air inlet port 4 as shown in FIG. 1, the air inlet mode is set to an outside-air inlet mode. When damper 5 closes outside-air inlet port 3 and opens inside-air inlet port 4 as shown in FIG. 2A, the air inlet mode is set to an inside-air inlet mode. When damper 5 opens both outside-air inlet port 3 and inside-air inlet port 4 as shown in FIG. 2B, the air inlet mode is set to a combination outside/inside-air inlet mode. The outside-air inlet port 3, inside-air inlet port 4 and switching damper 5 constitute an outside-air inlet means, an inside-air inlet means and an outside/inside-air inlet means.

In duct 1, a motor fan 6 for drawing in outside air and inside air and supplying the air toward the interior of the vehicle through the duct 1, and a first heat exchanger 2a and a second heat exchanger 2b which are incorporated in heat pump unit 2, are provided as shown in FIG. 1. The respective heat exchangers 2a and 2b exchange heat between the air supplied by motor fan 6 and a heat-exchange medium circulated by the heat pump unit 2 (for example, refrigerant), and heat the supplied air (heating-operation mode) or cool the supplied air (cooling-operation mode). An air mixing damper 2c is provided at a position immediately upstream of the second heat exchanger 2b, and it controls the air heating or cooling ability of the second heat exchanger 2b.

The air controlled in the respective air operation modes for air conditioning is discharged from vent port 7, foot port 8 or/and defroster port 9, which are provided on the downstream portions of duct 1, into the interior of the vehicle. The volumes of air discharged from the respective ports 7, 8 and 9 are controlled by dampers 7a, 8a and 9a, respectively.

In the air conditioner thus constituted, a manual switch and an automatic switch for selecting the air inlet modes are provided in the present invention, and the air inlet modes are operated and controlled based on the difference between the temperatures of outside air and inside air, that is, the load for air conditioning. The control will be explained with reference to FIGS. 3 to 7.

As shown in FIG. 3, the switching damper 5 for selecting the air inlet mode is controlled by a control unit 10 (for example, a microcomputer) having a CPU, ROMs and RAMs. A selecting signal for an outside-air inlet mode or a selecting signal for an inside-air inlet mode by a manual switch 11, ON-OFF signal by an automatic switch 12, a setting signal by a temperature setting device 13 and detecting signals by a solar radiation sensor 14, an outside-air temperature sensor 15 and an inside-air temperature sensor 16 are inputted to control unit 10. Control unit 10 controls switching of damper 5 via a damper operating or driving circuit 17 based on these signals as shown in FIGS. 4 to 7. A target temperature of discharge air is calculated by the aforementioned equation using the signals sent from temperature setting device 13 and sensors 14 to 16, and a cooling-operation mode or a heating-operation mode is set. Further, the temperature difference (Tr–Tam: the detected inside-air temperature–the detected outside-air temperature) is calculated from the signals of outside-air temperature sensor 15 and inside-air temperature sensor 16, where, the temperature difference during operation is represented by $T_0$, and preset temperature differences for changing the air inlet modes are represented by $T_1$, $T_2$, $T_3$, $T_4$, $T_5$, $T_6$ and $T_7$. Further, the preset temperature differences are set to be $T_1 < T_2$ in FIG. 6A, $T_3 < T_4$ in FIG. 6B and $T_5 < T_6 < T_7$ in FIG. 7, respectively.

Figure 4A:
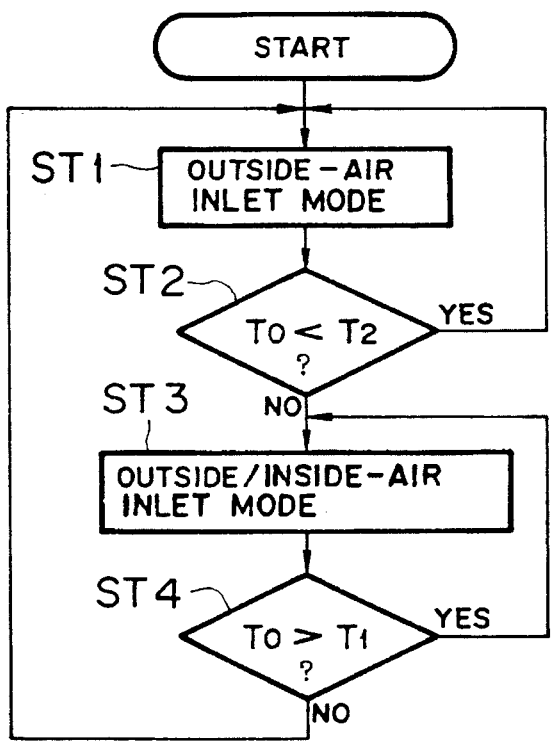
FIGS. 4A and 4B are flowcharts showing steps in the controls for switching a damper in the manual mode in the air conditioner shown in FIG. 1.

With respect to the control of the air inlet mode, firstly, in a case where the outside-air inlet signal is inputted from manual switch 11 and the heating-operation mode is selected based on the target temperature of discharge air will be explained with reference to FIGS. 4A and 6A.

When the outside-air inlet signal is inputted from manual switch 11, firstly the outside-air inlet mode is selected (step ST1). When the condition of $T_0 < T_2$ does not exist, namely, when the outside-air temperature is low and the load for the heating is great in this outside-air inlet mode, the mode is changed to the outside/inside-air inlet mode which allows both outside and inside air (steps ST2 and ST3) to be drawn into duct 1. Further, when the condition of $T_0 > T_1$ does not exist (step ST4), namely, when the outside-air temperature is high and the load for the heating is small in this outside/inside-air inlet mode, the mode is changed to the outside-air inlet mode again.

Figure 4B:
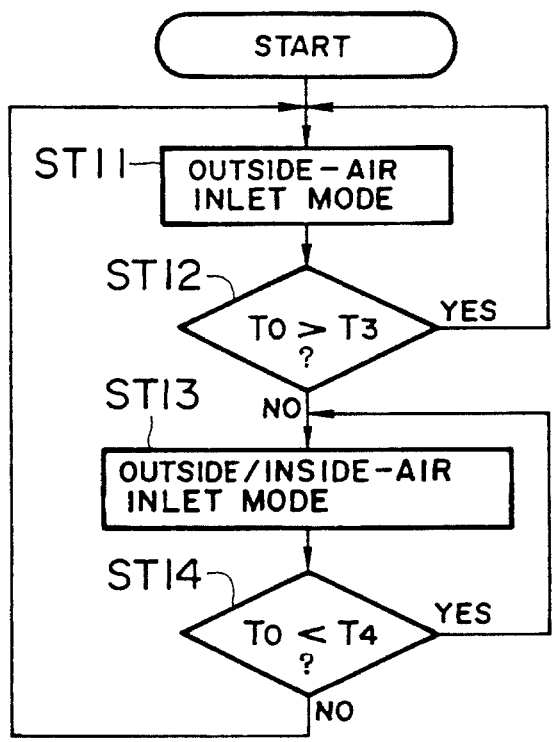

Next, in a case where the outside-air inlet signal is inputted from manual switch 11 and a cooling-operation mode is selected based on the target temperature of discharge air will be explained with reference to FIGS. 4B and 6B.

When the outside-air inlet signal is inputted from manual switch 11, the outside-air inlet mode is selected (step ST11), similar to the above-described control. When the condition of $T_0 > T_3$ does not exist, namely, when the outside-air temperature is high and the load for the cooling is great in this outside-air inlet mode, the mode is changed to the outside/inside-air inlet mode which allows both outside and inside air (steps ST12 and ST13) to be drawn into duct 1. Further, when the condition of $T_0 < T_4$ does not exist (step ST14), namely, when the outside-air temperature is low and the load for the cooling is small in this outside/inside-air inlet mode, the mode is changed to the outside-air inlet mode again.

As described above, when manual switch 11 is used to select the outside-air inlet, an appropriate air inlet mode in correspondence with the load for air conditioning will be automatically selected. When the inside-air inlet mode is selected by manual switch 11, the inside-air inlet mode is selected in either the heating or cooling operation mode.

Figure 5:
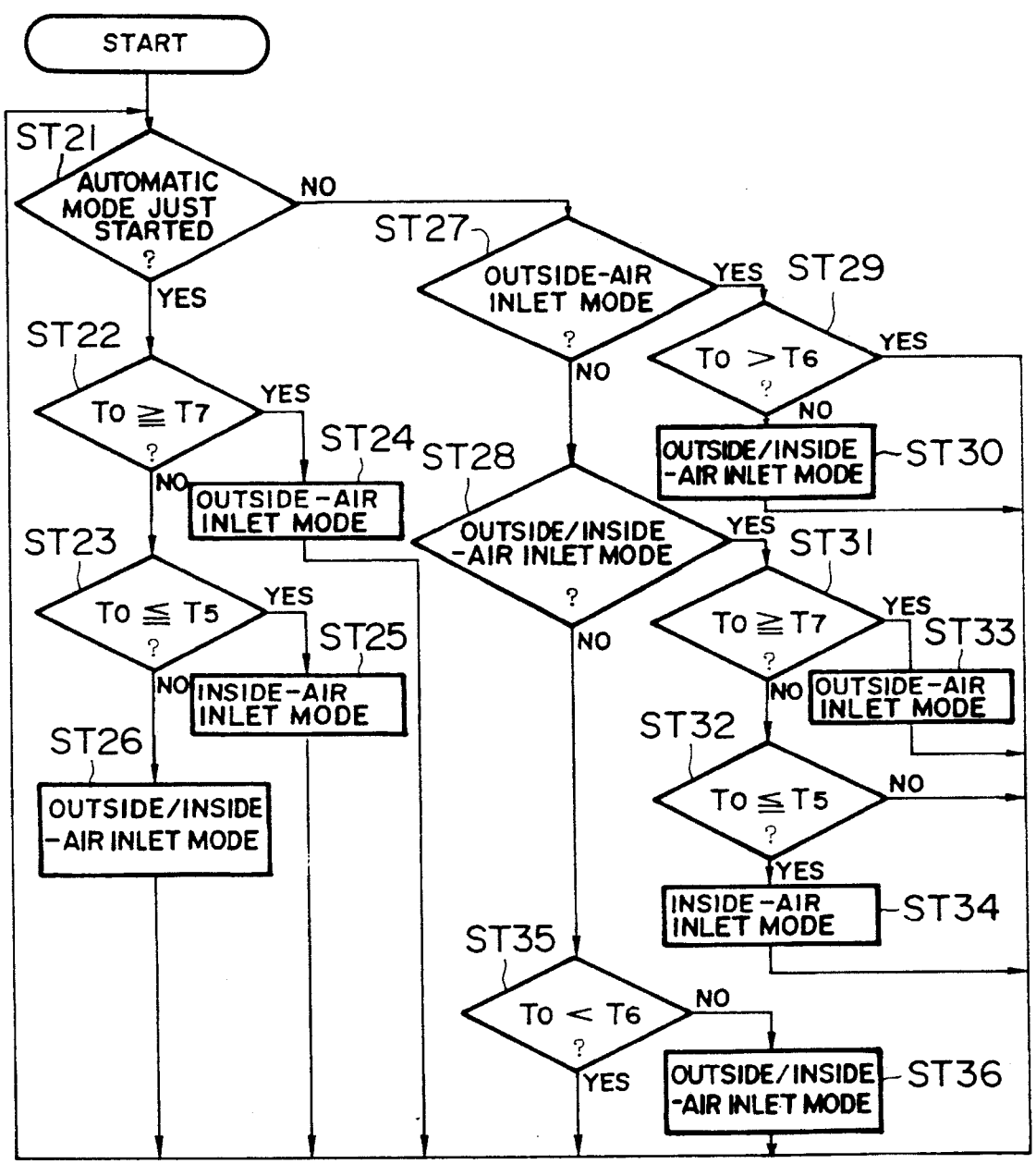
FIG. 5 is a flowchart showing steps in the control for switching a damper in the automatic mode in the air conditioner shown in FIG. 1.

Next, control of the air inlet mode where automatic switch 12 is turned on and the cooling-operation mode is selected based on the target temperature of discharge air will be explained with reference to FIGS. 5 and 7B.

Firstly, it is determined whether the automatic mode is just started (step ST21), and when the automatic mode is just started, it is determined whether the condition of $T_0 \geq T_7$ exists (step ST22). When the condition of $T_0 \geq T_7$ exists, namely, when the outside-air temperature is low and the load for the cooling is small, the air conditioner is operated in outside-air inlet mode (step ST24). When the condition of $T_0 \geq T_7$ does not exist ("NO" in step ST22), then the control procedure determines whether the condition of $T_0 \leq T_5$ exists (step ST23). When the condition of $T_0 \leq T_5$ exists, namely, when the load for the cooling is great, the air conditioner is operated in the inside-air inlet mode (step ST25). On the other hand, when any of the above conditions does not exists ($T_5 < T_0 < T_7$), the air conditioner is operated in the outside/inside-air inlet mode which allows both the outside air and the inside air (step ST26) to be drawn into duct 1.

After the automatic control is started, the outside-air inlet mode, the inside-air inlet mode or the outside/inside-air inlet mode is selected and the operation is continued. During the continued operation, the respective modes are determined again (steps ST27 and ST28). When the outside-air inlet mode has been selected, it is determined whether the condition of $T_0 > T_6$ exists (step ST29) and when this condition does not exist, namely, when the load for the air conditioning becomes slightly greater, the mode is changed to the outside/inside-air inlet mode (step ST30).

When it is determined that the mode is the outside/inside-air inlet mode at step ST28, it is further determined whether the condition of $T_0 \geq T_7$ or the condition of $T_0 \leq T_5$ exists (steps ST31 and ST32). When the condition of $T_0 \geq T_7$ exists, namely, when the load for cooling becomes small, the mode is changed to the outside-air inlet mode (step ST33). When the condition of $T_0 \leq T_5$ exists, namely, when the load for cooling becomes great, the mode is changed to the inside-air inlet mode (step ST34).

Further, when the mode is determined to be the inside-air inlet mode at step ST28 (i.e., "NO"), it is further determined whether the condition of $T_0 < T_6$ exists (step ST35). When this condition does not exist, namely, when the load for the air conditioning becomes slightly smaller, the mode is changed to the outside/inside-air inlet mode (step ST36).

As described hereinabove, even in the automatic control mode, the operation of an appropriate air inlet mode in correspondence with the load for air conditioning can be performed. When the air conditioner is in the heating-operation mode based on the target temperature of the discharge air set by the temperature setting device 13, the air inlet mode is fixed in the inside-air inlet mode as shown in FIG. 7A.

Although the outside-air inlet means, the inside-air inlet means and the outside/inside-air inlet means are comprised of inlet ports 3 and 4 and switching damper 5 in the above-described embodiment, respective dampers may be provided for the respective air inlet means, and the position of a damper for the outside/inside-air inlet mode may be provided and constructed so as to be continuously variable.

Although only one preferred embodiment of the present invention has been described in detail herein, the invention is not limited thereto. It will be appreciated by those skilled in the art that various modifications may be made without materially departing from the novel and advantageous teachings of the invention. Accordingly, the embodiment disclosed herein is by way of example only. It is to be understood that the scope of the invention is not to be limited thereby, but is to be determined by the claims which follow.

What is claimed is:

1. An air conditioner for vehicles comprising:

outside-air inlet means for drawing in outside air, inside-air inlet means for drawing in inside air and outside/inside-air inlet means for drawing in both outside air and inside air;

manual switch means for manually selecting any one of said respective inlet means and automatic switch means for automatically selecting one of said respective inlet means;

heating-operation means for heating air drawn in by any one of said respective inlet means and supplied by a fan and cooling-operation means for cooling said air supplied by said fan;

an inside-air temperature sensor for detecting a temperature of air inside the vehicle and an outside-air temperature sensor for detecting a temperature of air outside the vehicle; and control means for selectively driving said respective inlet means based on a condition of said respective operation means, a condition of said respective switch means and a difference between the temperatures detected by said respective temperature sensors.

2. The air conditioner for vehicles according to claim 1, wherein, when said manual switch means selects said outside-air inlet means, said control means selectively drives said outside-air inlet means and said outside/inside-air inlet means based on the temperatures detected by said respective temperature sensors.

3. The air conditioner for vehicles according to claim 1, wherein, when said automatic switch means is selected and said cooling-operation means is operating, said control means selectively drives said outside-air inlet means, said inside-air inlet means and said outside/inside-air inlet means based on the temperatures detected by said respective temperature sensors.

4. An air conditioner for vehicles, comprising:

operation means for selectively heating and cooling air;

air moving means for moving air through said operation means for selectively heating and cooling the air and discharging the air into an interior of the vehicle;

inlet means for selectively causing air to be drawn in by said air moving means from inside, outside and both inside and outside of the vehicle;

sensors for detecting air temperatures inside and outside of the vehicle; and control means for operating said inlet means to selectively supply inside air and outside air to said air moving means based on a heating and cooling operating condition of said operation means and the difference between the inside air temperature and the outside air temperature detected by said sensors.

5. The air conditioner for vehicles according to claim 4, further including manual switch means for manually selecting a mode of operation of said inlet means and automatic switch means for automatically selecting a mode of operation of said inlet means.

6. The air conditioner for vehicles according to claim 5, wherein, when said manual switch means selects a mode of operation of said inlet means for drawing in only outside air, said control means selectively operates said inlet means for drawing in at least one of either outside air or outside and inside air based on the inside and outside temperatures detected by said sensors.

7. The air conditioner for vehicles according to claim 5, wherein, when said automatic switch means is selected and said operation means is cooling the air, said control means selectively operates said inlet means for drawing in at least one of either inside air or outside and inside air based on the inside and outside temperatures detected by said sensors.

* * * * *